R. KIRK.
SPRING SUPPORT.
APPLICATION FILED APR. 9, 1917.
1,232,934.
Patented July 10, 1917.
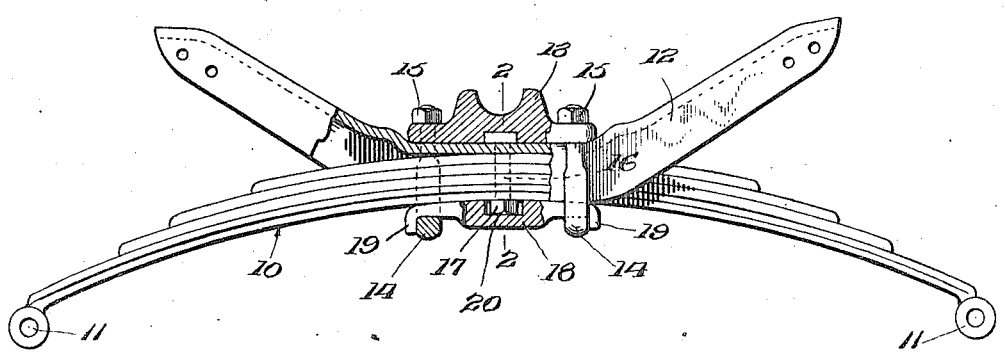
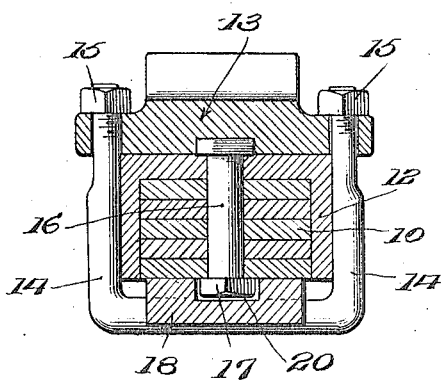
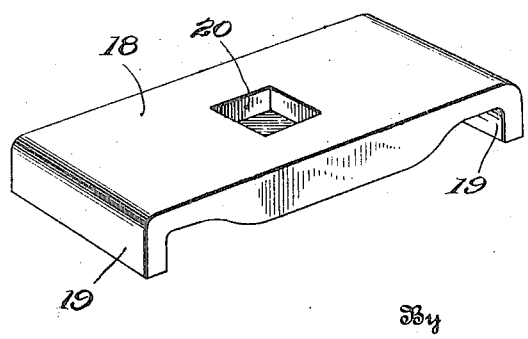
Inventor
R. Kirk.
By
Attorneys

UNITED STATES PATENT OFFICE.

RICHARD KIRK, OF LOGAN, WEST VIRGINIA.

SPRING-SUPPORT.

1,232,934.  Specification of Letters Patent.  Patented July 10, 1917.

Application filed April 9, 1917. Serial No. 160,764.

*To all whom it may concern:*

Be it known that I, RICHARD KIRK, a citizen of the United States, residing at Logan, in the county of Logan and State of West Virginia, have invented certain new and useful Improvements in Spring-Supports, of which the following is a specification.

This invention relates to attachments for springs, more particularly to leaf springs employed under vehicles, for the purpose of strengthening and reinforcing the springs and preventing the displacement of the clip devices whereby the springs are coupled to the bolsters or other supports.

Another object of the invention is to provide a device of this character whereby the holding clips of the springs and the clamp nuts of the bolt whereby the leaves of the spring are united, are prevented from displacement and the binding nut prevented from working loose or being detached by the jars and concussions to which the vehicle is subjected when in use.

With these and other objects in view, the invention consists in certain novel features of construction, as hereinafter shown and described and then specifically pointed out in the claims.

The improved device may be applied without material structural change to various constructions of springs of the leaf form, but is designed more particularly for use in connection with the leaf springs of automobiles and like vehicles, and for the purpose of illustration is shown applied to a conventional form of a spring of this class, and in the drawings illustrative of the preferred embodiment of the invention.

Figure 1 is a side elevation of a conventional spring, a bolster member, and the clip devices whereby the bolster is secured to the spring, with the improvement applied;

Fig. 2 is a transverse section, enlarged, on the line 2—2 of Fig. 1;

Fig. 3 is an enlarged perspective view of the supporting member.

Corresponding and like parts are referred to in the following description and indicated in all the views of the drawings by the same reference characters.

The spring proper is represented as a whole at 10 and comprises a plurality of superimposed leaves of varying lengths, the longer leaf having sockets 11 at the ends whereby the spring is swingingly supported from the running gear. The leaves which constitute the spring decrease in length from the member in which the sockets 11 are formed in the usual manner as shown. A conventional bolster is represented as a whole at 12 and is U shaped transversely and bears by its body portion upon the shorter leaf of the spring with the sides bearing against the side edges of all of the leaves of the spring, as shown. Bearing upon the body portion of the bolster centrally thereof is a bearing member 13, and embracing the spring members are clip devices 14 in U shape with the sides reduced and threaded to receive clamp nuts 15, the reduced portions of the clip extending through apertures in the bearing member 13. A clamp bolt 16 passes through the body portion of the bolster 12 and likewise through the leaves of the spring and is provided with a clamp nut 17 which bears against the longer leaf of the spring. Bearing beneath the central portion of the longer leaf of the spring is a reinforcing member, represented as a whole at 18, and reduced at the outer portions to extend between the slip devices 14 and the longer leaf of the spring, the terminals of the member 18 being directed at right angles to the body thereof, as shown at 19, and bearing against the outer edges of the clip devices. The laterally directed terminals 19 operate to hold the clip devices from outward displacement, or prevent them from being moved away from each other. It will be noted that the reinforcing member 18 being thickest at the center serves to effectually prevent the clip devices from moving toward each other, and thus coacts with the terminals 19 to firmly support and reinforce the clip devices and likewise reinforce the spring members. The member 18 is provided with a cavity 20 in its inner face to receive the clamp nut 17, and thus effectually prevent the latter from working loose or being displaced.

Many serious accidents have occurred from the tendency of the nut 17 in devices of this character, working loose and dropping off and thus releasing the bolt 16 and permitting it to become displaced. By employing the supporting member 18 such accidents are rendered impossible.

After the member 18 is disposed in position relative to the clips the clamp nuts 15 are rotated and the various parts firmly united and held in position.

The member 18 with its laterally directed terminals 19 reinforces the central or weaker portion of the spring where the bolt 16 passes through, and effectually prevents the clip devices from spreading apart or moving toward each other. The member 18 likewise takes a relatively large portion of the strain from the center of the spring and transfers it to the spring at each side of the center or toward the clip devices. The strain is thus transferred to the strongest portions of the spring, namely, where the clip devices embrace the spring, instead of at a single point centrally of the spring.

The improved device is simple in construction, can be adapted without material structural change to various forms of springs which are supported by clip devices disposed in spaced relation, and materially increases the strength of the coupling between the bolster and the spring and reinforces the latter without material addition to the weight or expense.

Having thus described the invention, what is claimed as new is:

1. The combination with a spring including a plurality of superimposed leaves, of a bolster device bearing upon said spring, a clamp bolt extending through said bolster and medially of said leaves, clips in spaced relation embracing said spring at opposite sides of said bolt, and a support bearing beneath said spring and extending between the clip devices and the adjacent leaf of the spring and over the adjacent terminal of the bolt.

2. The combination of a spring including a plurality of supporting leaves, a bolster device engaging the spring, a bearing member engaging the bolster, clip devices disposed in spaced relation and engaging the spring, bolster, and bearing member, a clamp bolt engaging through the spring and bolster and including a clamp nut, and a support bearing against said spring between the clip devices and having a socket to receive said clamp nut, the terminals of said support being extended between the clip devices and the spring.

In testimony whereof I affix my signature.

RICHARD KIRK. [L. S.]

Copies of this patent may be obtained for five cents each, by addressing the "Commissioner of Patents, Washington, D. C."